J. E. GRACE.
VEHICLE.
APPLICATION FILED NOV. 4, 1910.
1,008,713.
Patented Nov. 14, 1911.
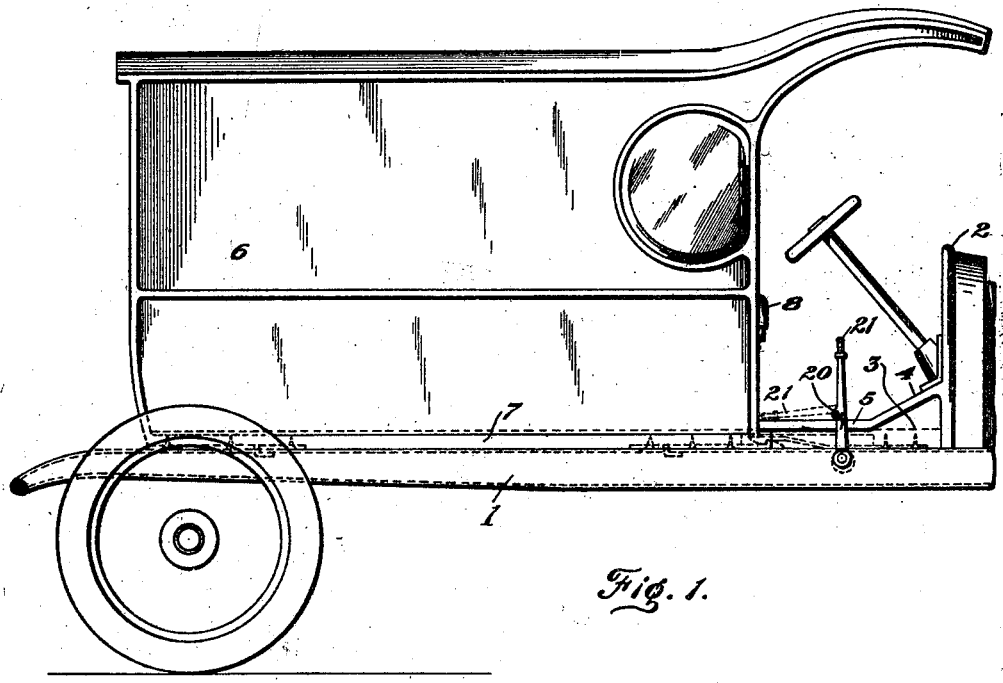
Fig. 1.
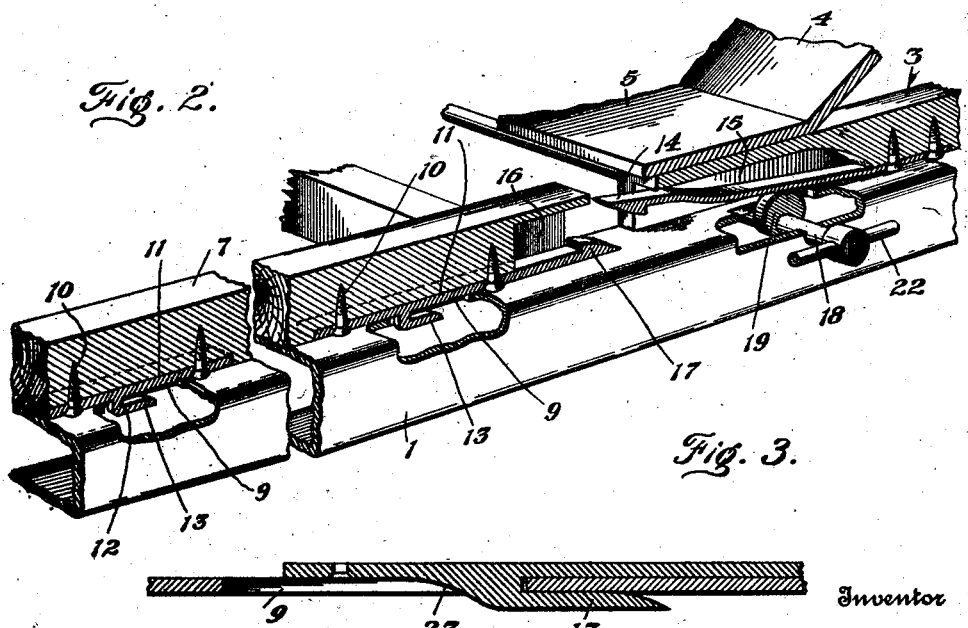
Fig. 2.
Fig. 3.
Inventor
JAMES E. GRACE.
Witnesses
Chas. W. Stauffiger
By
Attorneys

UNITED STATES PATENT OFFICE.

JAMES E. GRACE, OF DETROIT, MICHIGAN, ASSIGNOR, BY MESNE ASSIGNMENTS, TO CHIEF AUTOMOBILE COMPANY, A CORPORATION OF MICHIGAN.

VEHICLE.

1,008,713.     Specification of Letters Patent.     Patented Nov. 14, 1911.

Application filed November 4, 1910. Serial No. 590,634.

*To all whom it may concern:*

Be it known that I, JAMES E. GRACE, a citizen of the United States of America, residing at Detroit, in the county of Wayne and State of Michigan, have invented certain new and useful Improvements in Vehicles, of which the following is a specification, reference being had therein to the accompanying drawings.

This invention relates to a detachable body for motor vehicles and its object is to provide certain new and useful structural features for facilitating the removal of the body and cheap and efficient means for holding the body in place, which means may be quickly operated to release the body and when the body is replaced will automatically operate to secure it in place.

To this end the invention consists in the construction and arrangement of parts, all as hereinafter more fully described and particularly pointed out in the claims reference being had to the accompanying drawing in which, Figure 1 is a side elevation of an automobile body and chassis embodying the invention; Fig. 2 is a perspective detail of the locking mechanism for detachably securing the body to the chassis frame; and Fig. 3 is a sectional detail illustrating a modified form of securing hook.

As shown in the drawing 1 is a side member of an automobile chassis frame which is of the usual form and construction, the side members being preferably formed of U-shaped channel construction. Secured to the frame in any suitable manner near its forward end is the usual dash board 2 and side rails 3 extending rearwardly from the dash board and supporting a foot board 4 and floor 5.

6 is a body of any desired form and construction having side sills 7 resting upon the upper edges of the side members 1 of the frame with their forward ends abutting the side rails 3 when the body is in place upon the chassis. The body is also provided with a seat 8 secured within the body and forming a part thereof said seat being located at the forward end of the body in proper relation to the floor 5 when the body is in place.

To hold the side sills 7 of the body down upon the channel members 1 of the frame and to prevent the lateral movement of the body thereon, the U-shaped steel side members 1 of the frame are formed with slots 9 in their upper flanges and secured to the sills of the body by screws or bolts 10 are plates 11 let into recesses in the frame flush with the lower face thereof and each of these plates is provided with a downwardly projecting hook 12 to engage the slots 9. Each hook is formed with a forwardly projecting tongue 13 adapted to engage the inner side of the upper flange of the member 1 at the forward end of the slots when the hooks are inserted in the slots and the body then moved forwardly upon the frame. The hooks are of a width to fit within the slots and thus prevent lateral movement of the body upon the frame and the tongues 13 engaging beneath the flanges of the frame hold the body firmly down thereon.

To prevent the body from moving rearwardly upon the frame and thus disengaging the tongues 13 from the frame flanges, spring hooks 14 are secured within recesses 15 in the side rails 3 and the adjacent ends of the sills 7 of the body are recessed at 16 to receive the projecting ends of the hooks 14. Mating hooks 17 are secured to the sills 7 within the recess 16 in position to be engaged by the spring hooks 14 when the body is moved longitudinally forward upon the frame to engage the tongues 13 with the flanges of the frame. If desired, these hooks 16 may be formed integral with one of the plates 11 as shown.

To facilitate the disengagement of the spring hooks 14 from the hooks 17 and permit the ready removal of the body, a shaft 18 is mounted in bearings in the side members 1 of the chassis frame and extends across the same beneath the floor 5 and intermediate the ends of the hooks 14. Secured upon its shaft directly beneath each hook 14 is a cam member 19 which, when the shaft is turned will engage the hooks and raise the same simultaneously out of engagement with the hooks 17 against their spring action. The shaft may be provided as shown in Fig. 1 with an upwardly extending lever 20 by means of which it may be readily turned. This lever may be provided with a hinged upper end 21, the hinge connection being located at the floor level so that the extended upper end of the lever may be folded down upon the floor out of the way. As shown in Fig. 2, the shaft may be turned by means of a hand grip 22 or other device secured to its outer end if such construction be preferred to the lever 20.

In Fig. 3, a modified form of hook 12 is shown, said hook being provided with a slanting rear end 23 so that when the body is moved rearwardly to disengage the tongues 13 of the hooks, upon further rearward movement the inclined rear ends of the hooks will engage the rear ends of the slots 9 and the body will be lifted thereby, disengaging the hooks from the slots.

The hooks 14 being spring actuated, when the body is placed upon the frame and slid forwardly thereon to engage the hooks with the frame, said hooks 14 will automatically engage the hooks 17 and securely hold the body in place. A quick adjustment of the body is effected by turning the shaft 18 to raise the hooks out of locking position and then drawing the body rearwardly upon the frame to disengage the hooks 12.

What I claim is:—

1. The combination of a chassis frame having side members provided with openings, a body detachably supported by the frame, members on the body engaging the frame openings and interlocked therewith by a longitudinal movement of the body upon the frame, hooks secured to the forward end of the body, a dash board and side rails secured to the frame, interlocking spring members secured within recesses in the side rails to engage the hooks and prevent the longitudinal movement of the body upon the frame, and means carried by the chassis frame for operating the spring members.

2. The combination of a chassis frame having side channel members provided with openings, a body, hooks on the body engaged with said openings by an endwise movement of the body on the frame, a dash board and side rails secured to the frame, spring hooks secured in recesses in the rails and body to interlock in a horizontal position and hold the body against longitudinal movement, a shaft extending across the frame beneath the spring hooks on the rails, means on the shaft to engage and lift the hooks when the shaft is turned, and means on the outer end of the shaft for turning the same.

In testimony whereof I affix my signature in presence of two witnesses.

JAMES E. GRACE.

Witnesses:
A. M. DORR,
G. E. McGRANN.